United States Patent
Yamaguchi et al.

(10) Patent No.: US 9,110,776 B2
(45) Date of Patent: Aug. 18, 2015

(54) IMAGE FORMING APPARATUS, STARTUP CONTROL METHOD, AND NON-TRANSITORY COMPUTER-READABLE RECORDING MEDIUM ENCODED WITH STARTUP CONTROL PROGRAM

(71) Applicant: KONICA MINOLTA, INC., Chiyoda-ku (JP)

(72) Inventors: Takehisa Yamaguchi, Ikoma (JP); Toshihiko Otake, Ikeda (JP); Takeshi Minami, Amagasaki (JP); Masaya Hashimoto, Itami (JP); Tomoaki Nakajima, Kobe (JP); Takeshi Maekawa, Osaka (JP)

(73) Assignee: Konica Minolta, Inc., Chiyoda-ku, Tokyo (JP)

( * ) Notice: Subject to any disclaimer, the term of this patent is extended or adjusted under 35 U.S.C. 154(b) by 0 days.

(21) Appl. No.: 14/282,481

(22) Filed: May 20, 2014

(65) Prior Publication Data

US 2014/0340704 A1    Nov. 20, 2014

(30) Foreign Application Priority Data

May 20, 2013    (JP) .................................. 2013-105995

(51) Int. Cl.
G06F 13/00    (2006.01)

(52) U.S. Cl.
CPC ...................................... G06F 13/00 (2013.01)

(58) Field of Classification Search
USPC ........................................................ 358/1.15
See application file for complete search history.

(56) References Cited

U.S. PATENT DOCUMENTS

2005/0248584 A1*  11/2005  Takeo et al. .................... 345/603
2005/0254085 A1*  11/2005  Oshikiri et al. ............... 358/1.15

(Continued)

FOREIGN PATENT DOCUMENTS

| JP | 2008041027 | 2/2008 |
| JP | 2009-282773 A | 12/2009 |

(Continued)

OTHER PUBLICATIONS

Budruk et al.,PCI Express System Architecture, Apr. 2008, MindShare Inc., 9th Printing, PDF pp. 122-125, 142-143,158-161,168-173,181-185,189-191. Complete Document can be obtained using the following web site: http://www.mindshare.com/files/ebooks/pci%20express%20system%20architecture.pdf.*

(Continued)

*Primary Examiner* — Ngon Nguyen
(74) *Attorney, Agent, or Firm* — Buchanan Ingersoll & Rooney PC

(57) ABSTRACT

An image forming apparatus includes a main processing portion set as a root complex of PCI Express, a startup control portion to control startup of the main processing portion, and a connection portion connectable with an option board having a sub processing portion set as a root complex of PCI Express. The startup control portion includes a detection portion to detect the option board connected to the connection portion, an acquisition portion to acquire ability information about the option board at a stage before the main processing portion starts up, when the option board is detected, a selection portion to select one of the main processing portion and the sub processing portion, based on the acquired ability information, and a switch portion to start one selected from the main processing portion and the sub processing portion as a root complex.

20 Claims, 10 Drawing Sheets

(56) References Cited

U.S. PATENT DOCUMENTS

| | | |
|---|---|---|
| 2006/0227143 A1* | 10/2006 | Maita et al. .................. 345/501 |
| 2007/0130407 A1 | 6/2007 | Olson et al. |
| 2011/0064089 A1 | 3/2011 | Hidaka et al. |
| 2012/0086968 A1 | 4/2012 | Saito |
| 2012/0198102 A1 | 8/2012 | Saito |

FOREIGN PATENT DOCUMENTS

| | | |
|---|---|---|
| JP | 2010113582 | 5/2010 |
| JP | 2012-104105 A | 5/2012 |
| JP | 2012-176611 | 9/2012 |
| WO | 2009139489 | 11/2009 |

OTHER PUBLICATIONS

Notice of Ground of Rejection issued in corresponding Japanese Patent Application No. 2013-105995, mailed Jun. 2, 2015, and English translation thereof.

* cited by examiner

F I G. 1
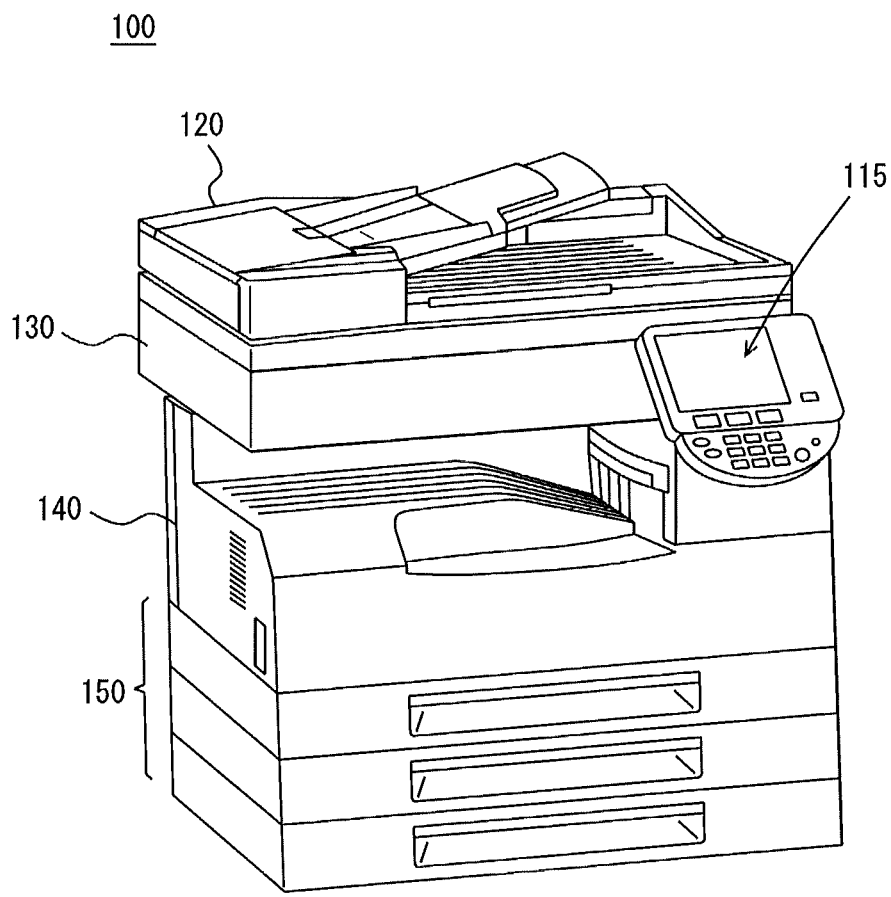

F I G. 9
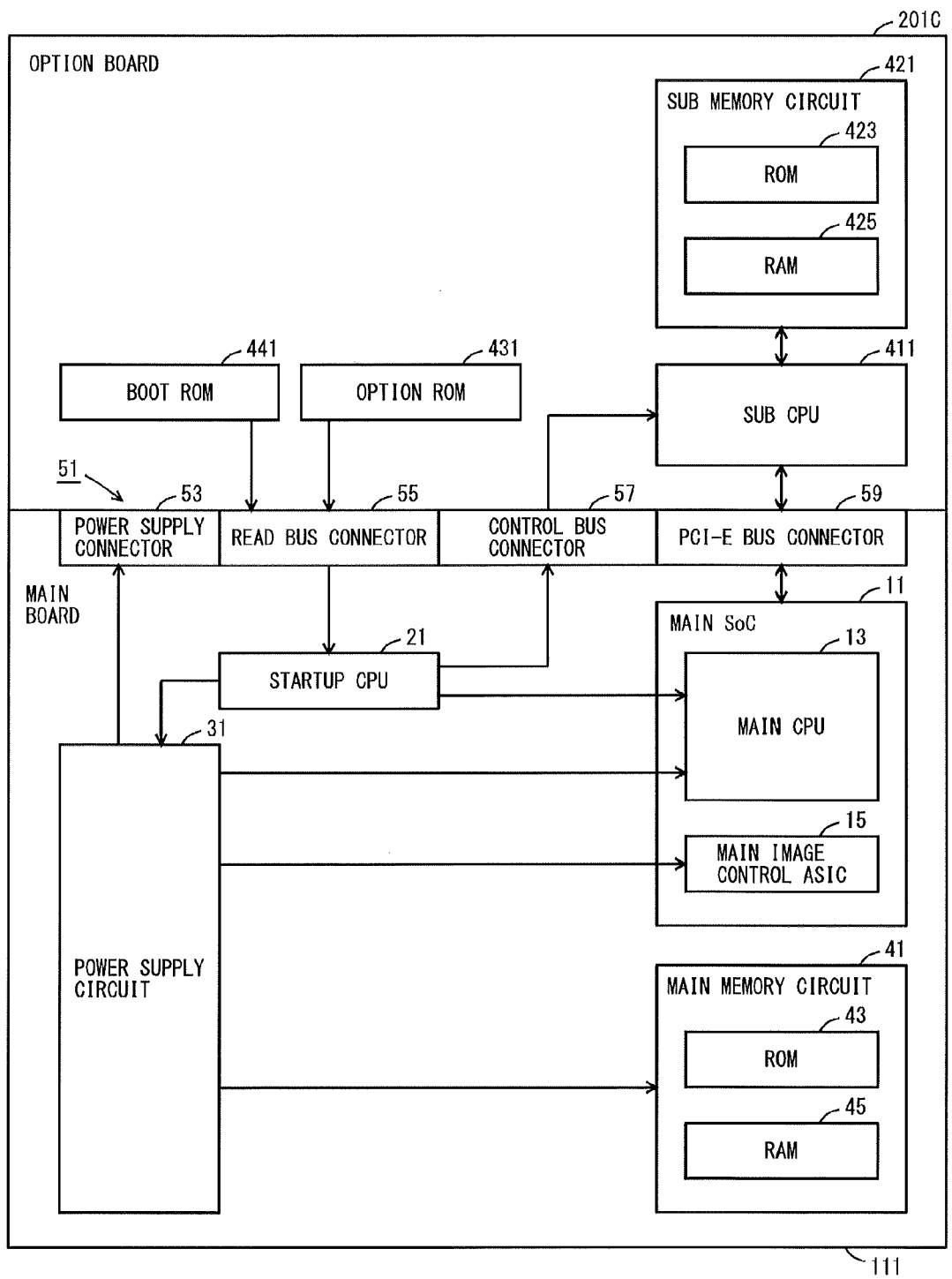

IMAGE FORMING APPARATUS, STARTUP CONTROL METHOD, AND NON-TRANSITORY COMPUTER-READABLE RECORDING MEDIUM ENCODED WITH STARTUP CONTROL PROGRAM

This application is based on Japanese Patent Application No. 2013-105995 filed with Japan Patent Office on May 20, 2013, the entire content of which is hereby incorporated by reference.

BACKGROUND OF THE INVENTION

1. Field of the Invention

The present invention relates to an image forming apparatus, and more particularly to an image forming apparatus to which an option board can be attached, a startup control method for the image forming apparatus, and a non-transitory computer-readable recording medium encoded with a startup control program allowing a computer controlling startup of the image forming apparatus to perform the startup control method.

2. Description of the Related Art

An image forming apparatus today, typically, such as a Multi-Functional Peripheral (MFP), includes a CPU for executing a program and is controlled by the CPU. MFPs to which external option boards can be attached to expand the functions have come on the market.

The PCI-Express standard is known as an interface for connecting a CPU to another circuit. For example, Japanese Patent Laid-Open No. 2009-282773 describes a technique for changing paths between a root complex and an end point depending on uses. The PCI-Express standard allows the CPU originally included in an MFP to control a circuit installed on an option board and thus facilitates connection of an option board.

Some option boards, however, include a CPU that executes a program. In order to keep compatibility with the CPU initially installed in an MFP, option boards are generally designed to be dedicated to MFPs on which they can be mounted. Accordingly, MFPs of different kinds cannot share common option boards.

SUMMARY OF THE INVENTION

According to an aspect of the present invention, an image forming apparatus includes a main processing portion set as a root complex of PCI Express, a startup control portion to control startup of the main processing portion, and a connection portion connectable with an option board having a sub processing portion set as a root complex of PCI Express. The startup control portion includes a detection portion to detect the option board connected to the connection portion, an acquisition portion to acquire ability information about the option board at a stage before the main processing portion starts up, when the option board is detected, a selection portion to select one of the main processing portion and the sub processing portion, based on the acquired ability information, and a switch portion to start one selected from the main processing portion and the sub processing portion as a root complex.

According to another aspect of the present invention, a startup control method is performed in an image forming apparatus. The image forming apparatus includes a main processing portion set as a root complex of PCI Express, and a connection portion connectable with an option board having a sub processing portion set as a root complex of PCI Express. The method allows the image forming apparatus to perform: a detection step of detecting the option board connected to the connection portion; an acquisition step of acquiring ability information about the option board at a stage before the main processing portion starts up, when the option board is detected; a selection step of selecting one of the main processing portion and the sub processing portion, based on the acquired ability information; and a switch step of starting one selected from the main processing portion and the sub processing portion as a root complex.

According to a further aspect of the present invention, a non-transitory computer-readable recording medium is encoded with a startup control program executed in a computer controlling startup of an image forming apparatus. The image forming apparatus includes a main processing portion set as a root complex of PCI Express, and a connection portion connectable with an option board having a sub processing portion set as a root complex of PCI Express. The program causes the computer to perform: a detection step of detecting the option board connected to the connection portion; an acquisition step of acquiring ability information about the option board at a stage before the main processing portion starts up, when the option board is detected; a selection step of selecting one of the main processing portion and the sub processing portion, based on the acquired ability information; and a switch step of starting one selected from the main processing portion and the sub processing portion as a root complex.

The foregoing and other features, aspects, and advantages of the present invention will become more apparent from the following detailed description of the present invention when taken in conjunction with the accompanying drawings.

BRIEF DESCRIPTION OF THE DRAWINGS

FIG. 1 is an external perspective view of an MFP in an embodiment of the present invention.

FIG. 9 is a block diagram showing an exemplary detailed configuration of a third option board.

DESCRIPTION OF THE PREFERRED EMBODIMENTS

Figure 2:
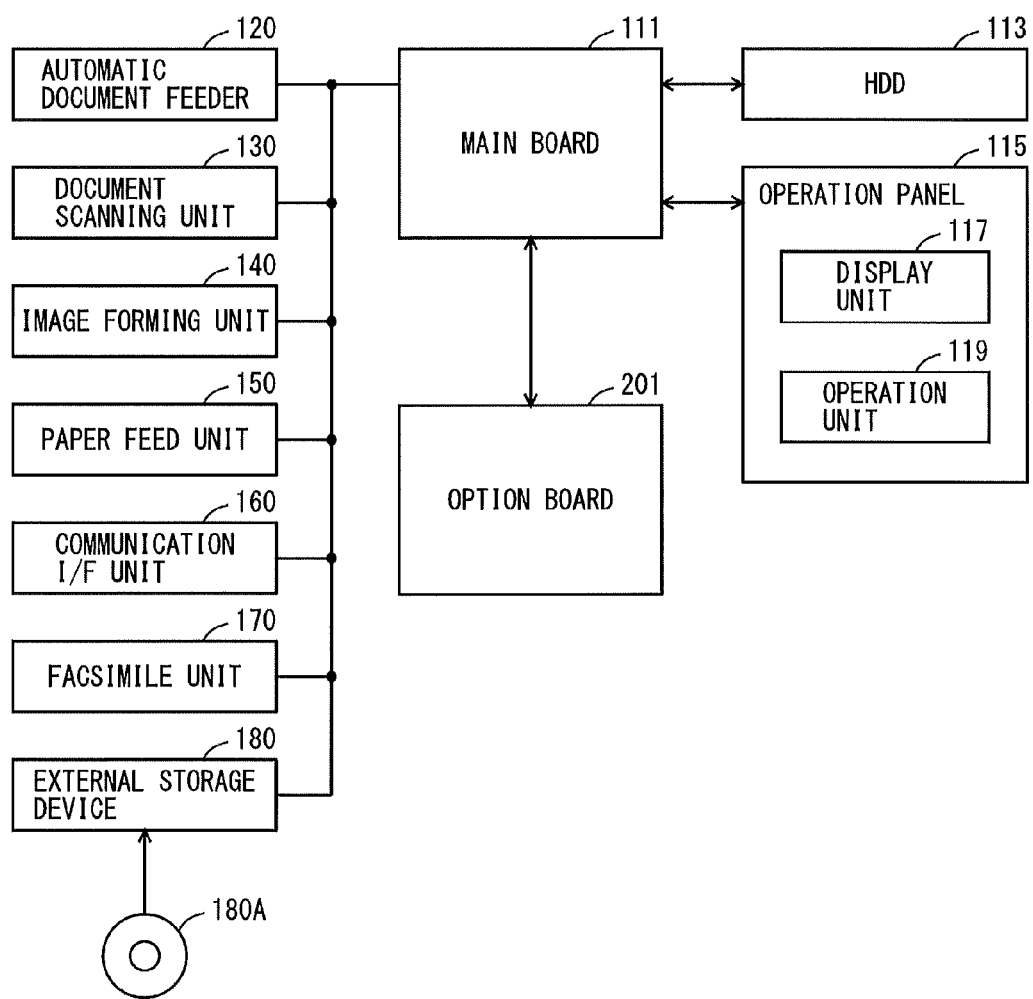
FIG. 2 is a block diagram showing an overview of the hardware configuration of the MFP.

Embodiments of the present invention will be described below with reference to the figures. In the following description, the same parts are denoted with the same reference signs. A detailed description thereof will not be repeated.

FIG. 1 is an external perspective view of an MFP in an embodiment of the present invention. Referring to FIG. 1, MFP 100 is an example of an image forming apparatus and includes a document scanning unit 130 for scanning a document, an automatic document feeder 120 for conveying a document to document scanning unit 130, an image forming unit 140 for forming an image on paper or other media based on image data output by document scanning unit 130 scanning a document, a paper feed unit 150 for supplying paper to image forming unit 140, and an operation panel 115 serving as a user interface.

Automatic document feeder 120 automatically conveys multiple sheets of a document set on a document feed tray, sheet by sheet, to a predetermined document scan position set on the platen glass of document scanning unit 130 and discharges the document having an image scanned by document scanning unit 130 onto a document output tray. Document scanning unit 130 includes a light source for applying light to the document conveyed to the document scan position and a photoelectric transducer receiving light reflected at the document, and scans a document image in accordance with the document size. The photoelectric transducer converts the received light into image data as an electrical signal and outputs the image data to image forming unit 140. Paper feed unit 150 conveys paper accommodated in a paper feed tray to image forming unit 140.

Image forming unit 140 forms an image by a known electrophotographic technique and forms an image on paper conveyed by paper feed unit 150, based on image data obtained by performing data processing such as shading correction on image data input from document scanning unit 130, or externally received image data.

Operation panel 115 is provided on the top face of MFP 100 to display an operation screen or other screens and functions as a user interface for accepting the user's operation.

FIG. 2 is a block diagram showing an overview of the hardware configuration of the MFP. Referring to FIG. 2, MFP 100 includes a main board 111, a communication interface (I/F) unit 160, a facsimile unit 170, and an external storage device 180, in addition to automatic document feeder 120, document scanning unit 130, image forming unit 140, and paper feed unit 150, each connected through a bus in accordance with the PCI-Express standard (hereinafter referred to as "PCI-E bus").

Main board 111 is connected with a hard disk drive (HDD) 113 as a mass storage device and operation panel 115. Main board 111 is connectable with an option board 201. In a default state of MFP 100, option board 201 is not connected to main board 111. Option board 201 will be detailed later.

Main board 111 includes a main CPU (Central Processing Unit) 13 (see FIG. 3) controlling the entire MFP 100. In a default state, main CPU 13 is set as a root complex in the PCI-E bus, and automatic document feeder 120, document scanning unit 130, image forming unit 140, paper feed unit 150, communication I/F unit 160, facsimile unit 170, and external storage device 180 are each set as an end point.

Communication I/F unit 160 is an interface for connecting MFP 100 to a network. Communication I/F unit 160 communicates with another computer connected to the network with a communication protocol such as TCP (Transmission Control Protocol) or FTP (File Transfer Protocol). The protocol for communication is not limited to those described above, and any protocol can be used. The network connected with communication I/F unit 160 is, for example, a Local Area Network (LAN), either wired or wireless. The network is not limited to a LAN and may be a Wide Area Network (WAN) or a network using a Public Switched Telephone Network (PSTN). The network is further connected to the Internet. MFP 100 therefore can communicate with a computer such as a server connected to the Internet.

Facsimile unit 170 is connected to the PSTN to transmit/receive facsimile data. A CD-ROM (Compact Disk Read Only Memory) 180A or a semiconductor memory is attached to external storage device 180. External storage device 180 reads out data stored in CD-ROM 118 or a semiconductor memory. External storage device 180 stores data into a semiconductor memory.

Operation panel 115 includes a display unit 117 and an operation unit 119. Display unit 117 is, for example, a Liquid Crystal Display (LCD) and displays instruction menus for users, information about acquired image data, and other information. Operation unit 119 includes a plurality of hard keys and a touch panel. The touch panel is a multi-touch panel superimposed on the top surface or the bottom surface of display unit 117 and detects the position designated by the user in the display screen on the display unit.

Figure 3:
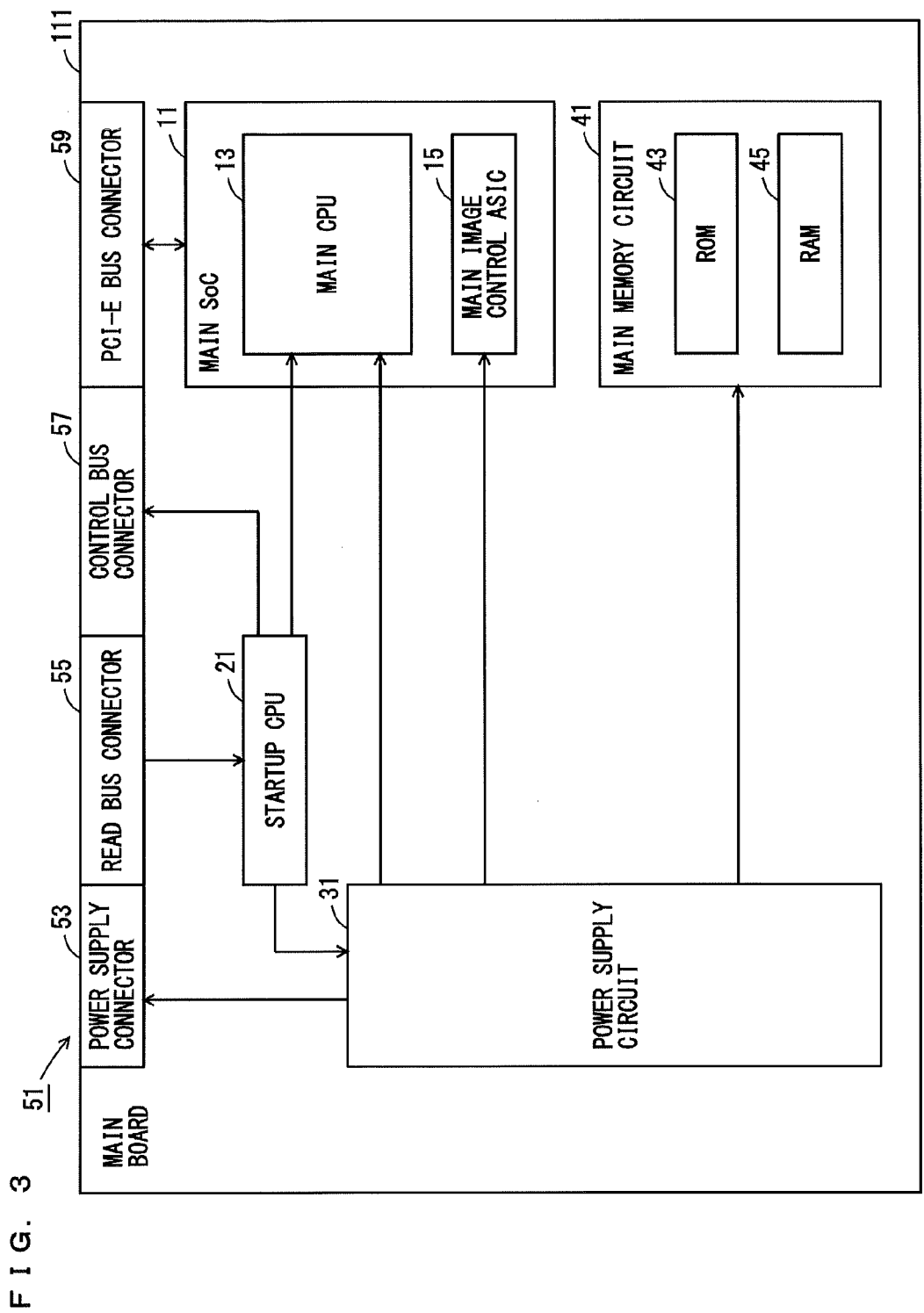
FIG. 3 is a block diagram showing an exemplary detailed configuration of a main board.

FIG. 3 is a block diagram showing an exemplary detailed configuration of the main board. Referring to FIG. 3, main board 111 includes a main SoC (System-on-a-Chip) 11, a startup CPU 21, a power supply circuit 31, a main memory circuit 41, and a connection connector 51.

Main SoC 11 includes a main CPU 13 and a main image control ASIC (Application Specific Integrated Circuit) 15.

Main memory circuit 41 includes a ROM (Read Only Memory) 43 for storing, for example, a program to be executed by main CPU 13 and a RAM (Random Access Memory) 45 used as a working area for main CPU 13.

Main CPU 13 is controlled by startup CPU 21 to start up and controls the entire MFP 100 by loading a program stored in ROM 43 included in main memory circuit 41 into RAM 45 for execution. Main CPU 13 is connected with HDD 113 and can access data stored in HDD 113 by executing a program for controlling HDD 113.

Main image control ASIC 15 is connected to main CPU 13 through the PCI-E bus and is controlled by main CPU 13 when main CPU 13 is a root complex. Main image control ASIC 15 includes an image processing circuit for processing an image and an input/output control circuit for controlling input/output of data. Main image control ASIC 15 is connected with operation panel 115. Main CPU 13 therefore can allow main image control ASIC 15 to perform image processing. Main CPU 13 allows a screen to appear on display unit 117 of operation panel 115 through main image control ASIC 15 and can detect the user's operation accepted by operation unit 119.

Startup CPU 21 executes a startup program during startup in which MFP 100 is powered on, and controls main SoC 11 and power supply circuit 31. The startup program executed by startup CPU 21 is stored in ROM 43 of main memory circuit 41. The startup program may be stored in a ROM provided separately from ROM 43 or may be recorded on CD-ROM 180A attached to external storage device 180. The program executed by CPU 21 is not limited to a program stored in ROM 43, HDD 113, or CD-ROM 180A. A program stored in HDD 113 may be loaded into a RAM for execution. In this case, another computer connected through a network may overwrite the startup control program stored in HDD 113 of MFP 100 or additionally write a new startup control program. MFP 100 may download a startup control program from another computer connected to a network and store the downloaded startup control program into HDD 113. The program referred to here includes not only a program directly executable by startup CPU 21 but also a source program, a compressed program, and an encrypted program.

Connection connector 51 can be connected with option board 201 and includes a power supply connector 53, a read bus connector 55, a control bus connector 57, and a PCI-E bus connector 59. Power supply connector 53 is connected to power supply circuit 31 and supplies power output from power supply circuit 31 to option board 201 when option board 201 is connected. Read bus connector 55 is connected with the read bus of startup CPU 21, and control bus connector 57 is connected with the control bus of startup CPU 21. PCI-E bus connector 59 is connected with the PCI-E bus of each of main CPU 13 and main image processing ASIC 15. PCI-E bus connector 59 is connected with the PCI-E bus to which automatic document feeder 120, document scanning unit 130, image forming unit 140, paper feed unit 150, communication I/F unit 160, facsimile unit 170, and external storage device 180 are connected.

Power supply circuit 31 supplies power to main SoC 11, startup CPU 21, main memory circuit 41, and connection connector 51. Power supply circuit 31 is controlled by startup CPU 21 and switches between a state in which power is supplied to main CPU 13, main image control ASIC 15 and main memory circuit 41 and a state in which power is not supplied. Power supply circuit 31 is controlled by startup CPU 21 and switches between a state in which power is supplied to option board 201 and a state in which power is not supplied. Specifically, power supply circuit 31 supplies power only to startup CPU 21 at a point of time when MFP 100 is powered on, and subsequently switches between a state in which power is supplied to main CPU 13, main image control ASIC 15, main memory circuit 41 and power supply connector 53 and a state in which power is not supplied, under the control of startup CPU 21.

Option board 201 has a connector connected with connection connector 51. When being connected with main board 111, option board 201 is supplied with power from main board 111 through power supply connector 53. Option board 201 includes a CPU or an SoC and has its control bus connected to control bus connector 57. The PCI-E bus of the CPU or the SoC of option board 201 is connected to PCI-E bus connector 59. The CPU of option board 201 or the CPU included in the SoC is hereinafter referred to as a sub CPU.

The sub CPU of option board 201 is controlled by startup CPU 21 of main board 111 to start up, executes a program stored in the ROM of option board 201, and starts up as a root complex. The ROM of option board 201 stores a program for setting the sub CPU of option board 201 as a root complex.

Option board 201 further includes an option ROM for storing the ability information on option board 201. The read bus of the option ROM is connected with read bus connector 55. The ability information is hereinafter referred to as an option ID. The option ID includes the performance of the sub CPU of option board 201, the presence or absence of a GPU (Graphics Processing Unit), the presence or absence of a sub image control ASIC, boot control information, power supply control information, and information about a boot program. The performance of the sub CPU of option board 201 includes the clock frequency of the sub CPU, the clock accuracy (ppm (parts per million), and the number of cores. The boot control information includes information about GPIO (General Purpose Input/Output) of the sub CPU, information about GPIO of the sub image control ASIC, if a sub image control ASIC is mounted, information about GPIO of the GPU, if a GPU is mounted, and information about a boot program for setting and starting main CPU 13 as an end point. The power supply information is information on circuits corresponding to a plurality of connection pins of power supply connector 53. Specifically, the power supply information shows the correspondence between a plurality of connection pins of power supply connector 53 and power supply input pins of a plurality of components of option board 201. The information about the boot program includes the presence or absence of a boot program for setting and starting main CPU 13 as an endpoint, and the memory address of the boot program.

When main CPU 13 starts up as a root complex, main CPU 13 detects an end point by detecting terminal end resistance using the PCI-E bus and establishes a link with the end point by executing a training sequence for establishing a link with the detected end point by hardware. Main CPU 13 thereafter reads information on the device serving as the end point with which a link is established, and makes necessary settings for controlling the device serving as the end point (mapping). When an option board is not connected, main CPU 13 detects each of main image control ASIC 15, automatic document feeder 120, document scanning unit 130, image forming unit 140, paper feed unit 150, communication I/F unit 160, facsimile unit 170, and external storage device 180 as an end point, and sets the end point such that it can be controlled.

Figure 4:
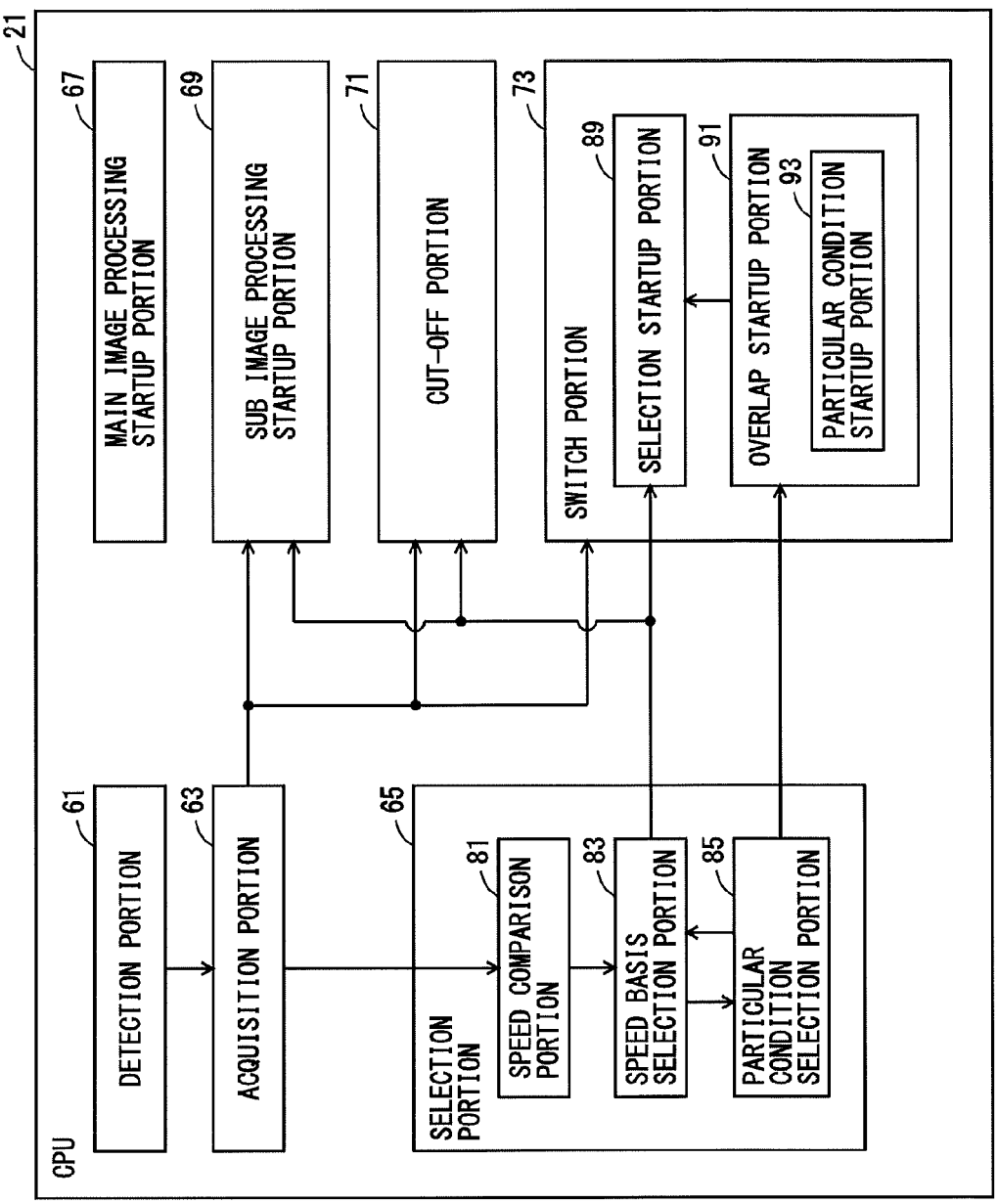
FIG. 4 is a block diagram showing an example of functions of a startup CPU.

FIG. 4 is a block diagram showing an example of functions of the startup CPU. The functions shown in FIG. 4 are functions formed in startup CPU 21 by startup CPU 21 executing the startup control program stored in ROM 43. Referring to FIG. 4, startup CPU 21 includes a detection portion 61 that detects whether option board 201 is connected, an acquisition portion 63 that acquires the option ID of option board 201, a selection portion 65, a main image processing startup portion 67, a sub image processing startup portion 69, a cut-off portion 71, and a switch portion 73.

Detection portion 61 determines whether option board 201 is connected to connection connector 51 at a point of time when MFP 100 is powered on. Specifically, detection portion 61 determines that option board 201 is connected to connection connector 51 when the option ROM of option board 201 is accessible through read bus connector 55. When it is determined that option board 201 is connected to connection connector 51, detection portion 61 outputs an acquisition instruction to acquisition portion 63.

Acquisition portion 63 acquires the option ID of option board 201 stored in the option ROM of option board 201, through read bus connector 55, in response to input of the acquisition instruction. Acquisition portion 63 outputs the acquired option ID to selection portion 65, sub image processing startup portion 69, cut-off portion 71, and switch portion 73.

Selection portion 65 selects one of main CPU 13 and the sub CPU of option board 201, based on the option ID of option board 201. Selection portion 65 includes a speed comparison portion 81, a speed basis selection portion 83, and a particular condition selection portion 85. Speed comparison portion 81 compares the operation speed of main CPU 13 with the operation speed of the sub CPU of option board 201. The operation speeds are compared based on the clock frequency included in the option ID of option board 201, and the comparison result is output to speed basis selection portion 83. The comparison may be based on the clock accuracy or the number of cores, rather than the clock frequency.

Speed basis selection portion 83 selects one with a higher operation speed from main CPU 13 and the sub CPU of option board 201, based on the comparison result input from speed comparison portion 81. When main CPU 13 is selected, speed basis selection portion 83 outputs a first select instruction indicating that main CPU 13 is to be selected, to particular condition selection portion 85. After outputting the first select instruction to particular condition selection portion 85, speed basis selection portion 83 outputs a switch instruction indicating that main CPU 13 has been selected, to switch portion 73, sub image processing startup portion 69, and cut-off portion 71, on condition that a non-select signal is input from particular condition selection portion 85. If a first overlap select signal is input from particular condition selection portion 85 after the first select instruction is output to particular condition selection portion 85, speed basis selection portion 83 does not output a switch instruction indicating that main CPU 13 has been selected, to switch portion 73, sub image processing startup portion 69, and cut-off portion 71.

When the sub CPU of option board 201 is selected, speed basis selection portion 83 outputs a second select instruction indicating the sub CPU of option board 201 is to be selected, to particular condition selection portion 85. After outputting the second select instruction to particular condition selection portion 85, speed basis selection portion 83 outputs a switch instruction indicating that the CPU of option board 201 has been selected, to switch portion 73, sub image processing startup portion 69, and cut-off portion 71, on condition that a non-select signal is input from particular condition selection portion 85. If a second overlap select signal is input from particular condition selection portion 85 after the second select instruction is output to particular condition selection portion 85, speed basis selection portion 83 does not output a switch instruction indicating that the CPU of option board 201 has been selected, to switch portion 73, sub image processing startup portion 69, and cut-off portion 71.

If the first select instruction is input from speed basis selection portion 83, particular condition selection portion 85 refers to the option ID of option board 201 to determine whether option board 201 has a GPU and stores a boot program for setting and starting main CPU 13 as an end point. If option board 201 has a GPU and stores a boot program for setting and starting main CPU 13 as an end point, particular condition selection portion 85 selects the sub CPU and outputs a first overlap startup signal indicating that the sub CPU has been selected, to switch portion 73 and speed basis selection portion 83. If option board 201 does not have a GPU or store a boot program for setting and starting main CPU 13 as an end point, particular condition selection portion 85 outputs a non-select signal to speed basis selection portion 83 without selecting the sub CPU of the option board.

If the second select instruction is input from speed basis selection portion 83, particular condition selection portion 85 refers to the option ID of option board 201 to determine whether a boot program for setting and starting main CPU 13 as an end point is stored. Particular condition selection portion 85 also determines whether HDD 113 is used. Whether HDD 113 is used may be set in MFP 100 in advance or may be input by the user to operation unit 119 at startup of MFP 100. If option board 201 stores a boot program for setting and starting main CPU 13 as an end point, and if the use of HDD 113 is set, particular condition selection portion 85 outputs a second overlap startup signal indicating that HDD 113 is to be used, to switch portion 73 and speed basis selection portion 83. If the use of HDD 113 is not set or if a boot program for setting and starting main CPU 13 as an end point is not stored, particular condition selection portion 85 outputs a non-select signal to speed basis selection portion 83.

Main image processing startup portion 67 starts main image control ASIC 15 at a point of time when MFP 100 is powered on. Specifically, power supply circuit 31 is controlled such that power is supplied to main image control ASIC 15, and main image control ASIC 15 is reset. Since main image control ASIC 15 is set as an end point in the PCI-E bus, main image control ASIC 15 is supplied with power from power supply circuit 31, starts up as an end point when a reset signal is input, and is controlled by one of main CPU 13 and the sub CPU of option board 201 that is set as a root complex.

Sub image processing startup portion 69 receives the option ID of option board 201 from acquisition portion 63 and receives a switch instruction indicating that main CPU 13 has been selected or a switch instruction indicating that the sub CPU of option board 201 has been selected, from speed basis selection portion 83. Sub image processing startup portion 69 refers to the presence or absence of a sub image control ASIC in the option ID of option board 201 and determines whether a sub image control ASIC is mounted on option board 201. If a sub image control ASIC is mounted on option board 201, sub image processing startup portion 69 starts the sub image control ASIC of option board 201 in response to input of a switch instruction indicating main CPU 13 has been selected or a switch instruction indicating that the sub CPU has been selected, from speed basis selection portion 83.

Specifically, when the sub image control ASIC of option board 201 is started, sub image processing startup portion 69 refers to the power supply information included in the option ID of option board 201 to specify a connection pin corresponding to the power supply input pin of the sub image control ASIC of option board 201 among a plurality of connection pins of power supply connector 53, and allows power supply circuit 31 to supply power to the specified connection pin of power supply connector 53. Since the sub image control ASIC of option board 201 is set as an end point in the PCI-E bus, the sub image control ASIC of option board 201 starts up as an end point when power is supplied from power supply circuit 31, and is controlled by one of main CPU 13 and the sub CPU of option board 201 that is set as a root complex.

Cut-off portion 71 receives the option ID of option board 201 from acquisition portion 63 and receives a switch instruction indicating that main CPU 13 has been selected or a switch instruction indicating that the sub CPU of option board 201 has been selected, from speed basis selection portion 83. Sub image processing startup portion 69 refers to the presence or absence of a sub image control ASIC in the option ID of option board 201 and determines the presence or absence of a sub image control ASIC on option board 201. Sub image processing startup portion 69 also refers to the presence or absence of a GPU in the option ID of option board 201 and determines whether a GPU is mounted on option board 201.

Cut-off portion 71 outputs nothing if a sub image control ASIC is mounted on option board 201 or if a GPU is mounted on option board 201. Cut-off portion 71 outputs nothing if a sub image control ASIC is mounted on option board 201 or if a GPU is mounted on option board 201 and if a switch instruction indicating that the sub CPU of option board 201 has been selected is input from speed basis selection portion 83.

If neither a sub image control ASIC nor a GPU is mounted on option board 201, cut-off portion 71 controls power supply circuit 31 such that power to be supplied to power supply connector 53 is cut off, in response to input of a switch instruction indicating that main CPU 13 has been selected from speed basis selection portion 83. Accordingly, no power is supplied to option board 201, thereby reducing power consumed by option board 201.

Switch portion 73 starts one of main CPU 13 and the sub CPU as a root complex. Switch portion 73 receives the option ID of option board 201 from acquisition portion 63 and receives one of a switch instruction indicating that main CPU 13 has been selected, a switch instruction indicating that the sub CPU has been selected, a first overlap startup instruction, and a second overlap startup instruction from selection portion 65.

Switch portion 73 includes a selection startup portion 89 and an overlap startup portion 91. Selection startup portion 89 starts main CPU 13 as a root complex if a switch instruction indicating that main CPU 13 has been selected is input from speed basis selection portion 83. Specifically, selection startup portion 89 allows power supply circuit 31 to supply power to the power input pin of main CPU 13 and resets main CPU 13. When being reset, main CPU 13 executes a program stored in ROM 43. Since the program stored in ROM 43 sets main CPU 13 as a root complex, main CPU 13 starts up as a root complex by executing the program stored in ROM 43.

If a switch instruction indicating that main CPU 13 has been selected is input from speed basis selection portion 83, selection startup portion 89 does not start the sub CPU. Specifically, selection startup portion 89 refers to the power supply information included in the option ID of option board 201 to specify the connection pin corresponding to the power supply input pin of the sub CPU of option board 201 among a plurality of connection pins of connection connector 51 and allows power supply circuit 31 to cut off power to be supplied to the specified connection pin. The sub CPU of option board 201 does not start up because no power is supplied.

If a switch instruction indicating the sub CPU of option board 201 has been selected is input from speed basis selection portion 83, selection startup portion 89 starts the sub CPU of option board 201 as a root complex. Specifically, selection startup portion 89 refers to the power supply information included in the option ID of option board 201 to specify the connection pin corresponding to the power supply input pin of the sub CPU of option board 201 among a plurality of connection pins of connection connector 51 and allows power supply circuit 31 to supply power to the specified connection pin. Selection startup portion 89 further refers to the boot information included in the option ID of option board 201 to specify information about GPIO of the sub CPU of option board 201 and outputs a reset signal to the sub CPU of option board 201. Since the control bus of startup CPU 21 is connected with the control bus of the sub CPU of option board 201 through control bus connector 57, selection startup portion 89 resets the sub CPU of option board 201 by using the control bus. When being reset, the sub CPU of option board 201 executes a program stored in the ROM of option board 201. Since the program stored in the ROM of option board 201 sets the sub CPU of option board 201 as a root complex, the sub CPU of option board 201 starts up as a root complex by executing the program stored in the ROM of option board 201.

If a switch instruction indicating that the sub CPU has been selected is input from speed basis selection portion 83, selection startup portion 89 does not start main CPU 13. Specifically, selection startup portion 89 allows power supply circuit 31 to cut off power to be supplied to the power supply input pin of main CPU 13. Main CPU 13 does not start up because no power is supplied.

When a first overlap startup signal or a second overlap startup signal is input from particular condition selection portion 85, overlap startup portion 91 starts main CPU 13 as an end point and starts the sub CPU of option board 201 as a root complex. Overlap startup portion 91 includes a particular condition startup portion 93. Particular condition startup portion 93 refers to the option ID of option board 201 to specify the memory address of the boot program for setting and starting main CPU 13 as an end point. Particular condition startup portion 93 then allows power supply circuit 31 to supply power to the power input pin of main CPU 13 and, in addition, sets and resets the boot program stored in option board 201 as a boot program of main CPU 13.

When the boot program stored in option board 201 is set as a boot program and reset, main CPU 13 executes the boot program stored in option board 201. Since the boot program stored in option board 201 sets main CPU 13 as an end point, main CPU 13 starts up as an end point by executing the boot program stored in option board 201. When starting as an end point, main CPU 13 executes a program for controlling HDD 113 and controls HDD 113.

Overlap startup portion 91 allows power supply circuit 31 to supply power to the power supply input pin of the sub CPU of option board 201 and outputs a reset signal to the sub CPU of option board 201. The sub CPU of option board 201 executes the program stored in the ROM of option board 201 and starts as a root complex. The sub CPU of option board 201 therefore starts as a root complex when being reset by overlap startup portion 91.

Figure 5:
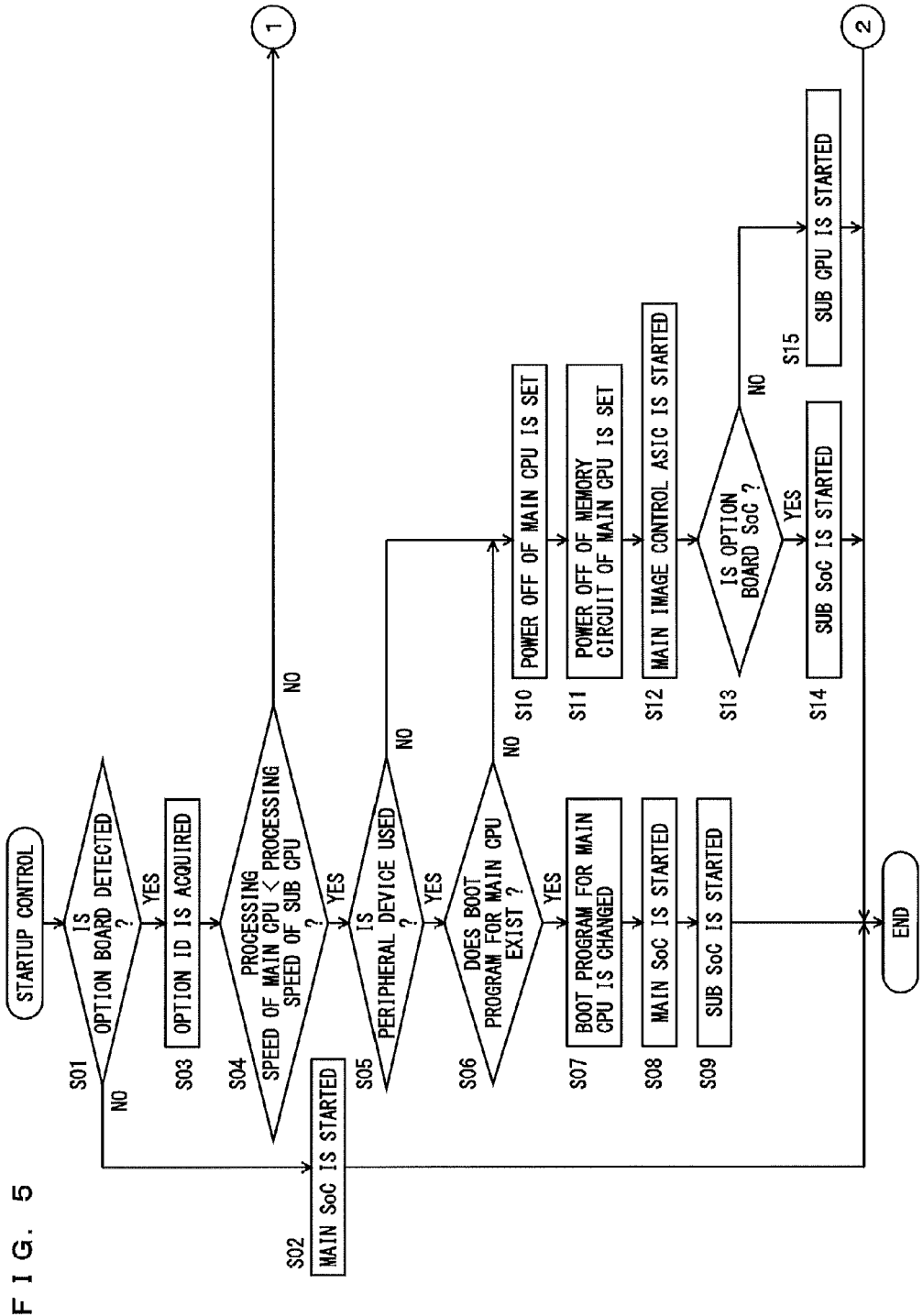
FIG. 5 is a first flowchart showing an example of the procedure of a startup control process.
Figure 6:
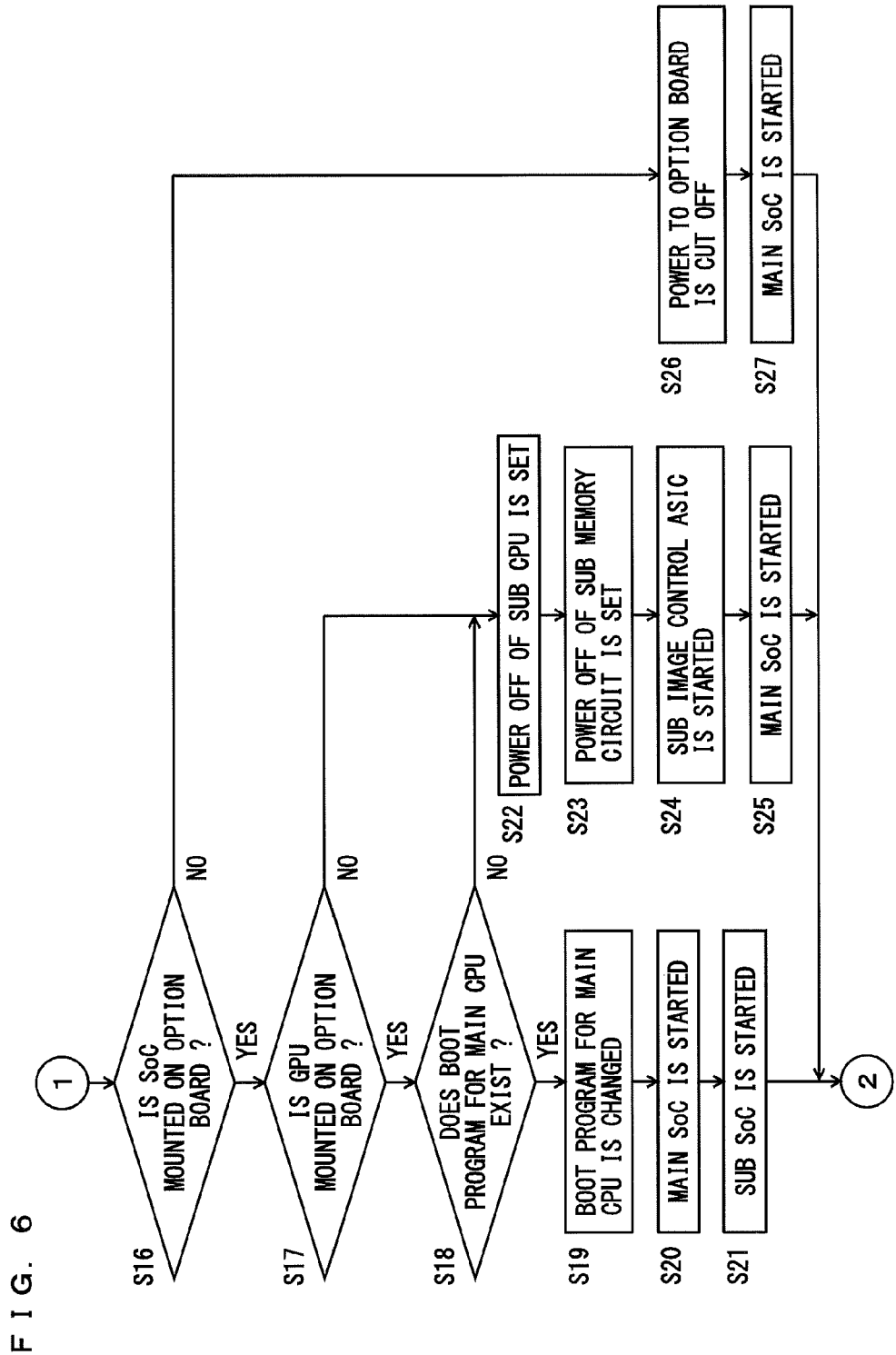
FIG. 6 is a second flowchart showing an example of the procedure of the startup control process.

FIG. 5 and FIG. 6 are flowcharts showing an example of the procedure of a startup control process. The startup control process is a process performed by startup CPU 21 by startup CPU 21 executing the startup control program stored in the ROM at a point of time when MFP 100 is powered on. Referring to FIG. 5, startup CPU 21 determines whether option board 201 has been detected (step S01). If option board 201 has been detected, the process proceeds to step S03. If not, the process proceeds to step S02. In step S02, main SoC 11 is started. The process then ends. Specifically, power supply circuit 31 is allowed to supply power to main SoC 11 and main memory circuit 41, and main CPU 13 is reset.

In step S03, the option ID of option board 201 is acquired. Specifically, the option ID of option board 201 stored in the option ROM of option board 201 is acquired through read bus connector 55. In the next step S04, it is determined whether the processing speed of the sub CPU of option board 201 is higher than the processing speed of main CPU 13. The clock frequency of the sub CPU in the option ID acquired in step S03 is compared with the clock frequency of main CPU 13. If the processing speed of the sub CPU of option board 201 is higher than the processing speed of main CPU 13, the process proceeds to step S05. If not, the process proceeds to step S16.

In step S05, it is determined whether a peripheral device is used. It is determined whether the use of HDD 113 is preset. Whether HDD 113 is used may be decided by the operation input by the user to operation unit 119. If HDD 113 is to be used, the process proceeds to step S06. If not, the process proceeds to step S10.

In step S07, the boot program for main CPU 13 is changed to the boot program stored in option board 201. The main SoC is then started (step S08). Specifically, power supply circuit 31 is allowed to supply power to the power input pin of main CPU 13 and the power input pin of main image control ASIC 15, and main CPU 13 is reset. Main CPU 13 then executes the boot program for main CPU 13 stored in option board 201 and starts up as an end point.

In the next step S09, the sub SoC is started. The process then ends. Specifically, power supply circuit 31 is allowed to supply power to the power supply input pin of the sub SoC of option board 201, and the sub CPU is reset. The sub CPU of option board 201 then executes the boot program stored in the ROM of option board 201 and starts up as a root complex. In this case, the sub CPU of option board 201 is a root complex, and main CPU 13 and main image control ASIC 15 are end points. The sub CPU of option board 201 thus can control main image control ASIC 15. Main CPU 13 executes a program for accessing HDD 113, so that the sub CPU of option board 201 can control HDD 113.

In step S10, the power supply of the main CPU is set OFF. Specifically, power supply circuit 31 is controlled such that power is not supplied to the power supply input pin of main CPU 13. In step S11, the power supply of main memory circuit 41 is set OFF. Specifically, power supply circuit 31 is controlled such that power is not supplied to the power supply input pin of main memory circuit 41. In step S12, main image control ASIC 15 is started. Specifically, power supply circuit 31 is controlled such that power is supplied to the power supply input pin of main image control ASIC 15.

In step S13, it is determined whether an SoC is mounted on option board 201. It is determined that an SoC is mounted on the option board if the presence or absence of a GPU in the option ID acquired in step S03 is set "present" or if the presence or absence of an image control ASIC is set "present." If an SoC is mounted on option board 201, the process proceeds to step S14. If not, the process proceeds to step S15.

In step S14, the sub SoC is started. The process then ends. Specifically, if option board 201 includes a sub image control ASIC or a GPU, power supply circuit 31 is allowed to supply power to the power input pin of the sub image control ASIC or the GPU. Power supply circuit 31 is allowed to further supply power to the power input pin of the sub CPU, and the sub CPU is reset. The sub CPU of option board 201 executes the boot program for the sub CPU stored in the ROM of option board 201 and starts up as a root complex. In this case, the sub CPU of option board 201 is a root complex, main image control ASIC 15 is an end point, and the sub image control ASIC or GPU of option board 201 is an end point. The sub CPU of option board 201 thus can control main image control ASIC 15 and the sub image control ASIC or GPU of option board 201.

In step S15, the sub CPU is started. The process then ends. Specifically, power supply circuit 31 is allowed to supply power to the power input pin of the sub CPU, and the sub CPU is reset. The sub CPU of option board 201 then executes the boot program for the sub CPU stored in the ROM of option board 201 and starts up as a root complex. In this case, the sub CPU of option board 201 is a root complex, and main image control ASIC 15 is an end point. The sub CPU of option board 201 thus can control main image control ASIC 15.

The process proceeds to step S16 if the processing speed of main CPU 13 is equal to or higher than the processing speed of the sub CPU of option board 201. In step S16, it is determined whether an SoC is mounted on the option board. If the presence or absence of a GPU in the option ID acquired in step S03 is set "present" or if the presence or absence of an image control ASIC is set "present," it is determined that an SoC is mounted on the option board. If the presence or absence of a GPU in the option ID acquired in step S03 is set "absent" and if the presence or absence of an image control ASIC is set "absent," it is determined that an SoC is not mounted on the option board. If an SoC is mounted on the option board, the process proceeds to step S17. If not, the process proceeds to step S26.

In step S17, it is determined whether a GPU is mounted on option board 201. If the presence or absence of a GPU in the option ID acquired in step S03 is set "present," the process proceeds to step S18. If set "absent," the process proceeds to step S23.

In step S18, it is determined whether option board 201 stores a boot program for main CPU 13. The information about the boot program in the option ID acquired in step S03 is referred to, and if the presence or absence of a boot program for setting and starting main CPU 13 as an end point is set "present," the process proceeds to step S19. If not, the process proceeds to step S22.

In step S19, the boot program for main CPU 13 is changed to the boot program stored in option board 201. The main SoC is then started (step S20). Specifically, power supply control circuit 31 is allowed to supply power to the power input pin of main CPU 13 and the power input pin of main image control ASIC 15, and main CPU 13 is reset. Main CPU 13 then executes the boot program for main CPU 13 stored in option board 201 and starts up as an end point.

In the next step S21, the sub SoC is started. The process then ends. Specifically, power supply circuit 31 is allowed to supply power to the power supply input pin of each of the sub CPU and the GPU of option board 201, and the sub CPU is reset. The sub CPU of option board 201 then executes the boot program stored in the ROM of option board 201 and starts up as a root complex, and the GPU of option board 201 starts up as an end point. In this case, the sub CPU of option board 201 is a root complex, the GPU of option board 201 is an end point, and main CPU 13 and main image control ASIC 15 are end points. The sub CPU of option board 201 thus can control the GPU of option board 201 and main image control ASIC 15. Main CPU 13 executes a program for accessing HDD 113, so that the sub CPU of option board 201 can control HDD 113.

On the other hand, in step S22, the power supply of the sub CPU of option board 201 is set OFF. Specifically, power supply circuit 31 is controlled such that power is not supplied to the power supply input pin of the sub CPU of option board 201.

In the next step S23, the power supply of the sub memory circuit of option board 201 is set OFF. Specifically, power supply circuit 31 is controlled such that power is not supplied to the power supply input pin of the sub memory circuit of option board 201.

In the next step S24, the sub image control ASIC of option board 201 is started. Specifically, power supply circuit 31 is controlled such that power is supplied to the power supply input pin of the sub image control ASIC of option board 201.

In the next step S25, the main SoC is started. The process then ends. Specifically, power supply circuit 31 is allowed to supply power to the power input pin of main CPU 13 and the power input pin of main image control ASIC 15, and main CPU 13 is reset. Main CPU 13 then executes the boot program for main CPU 13 stored in ROM 43 of main memory circuit 41 and starts up as a root complex. In this case, main CPU 13 is a root complex, main image control ASIC 15 is an end point, and the sub image control ASIC of option board 201 is an end point. Main CPU 13 thus can control main image control ASIC 15 and sub image control ASIC of option board 201.

The process proceeds to step S26 if the processing speed of main CPU 13 is equal to or higher than the processing speed of the sub CPU of option board 201, the sub CPU is a general processor, and neither a GPU nor an ASIC is mounted on option board 201. In this case, in step S26, power supplied to option board 201 is cut off. Specifically, power supply circuit 31 is controlled such that power is not supplied to power supply connector 53.

In the next step S27, the main SoC is started. The process then ends. Specifically, power supply circuit 31 is allowed to supply power to the power input pin of main CPU 13 and the power input pin of main image control ASIC 15. Main CPU 13 then executes the boot program for main CPU 13 stored in ROM 43 of main memory circuit 41 and starts up as a root complex. In this case, main CPU 13 is a root complex, and main image control ASIC 15 is an end point. No power is supplied to option board 201.

First to fourth option boards 201A to 201D will be illustrated as specific examples of option board 201, each being connected to main board 111.

<First Option Board>

Figure 7:
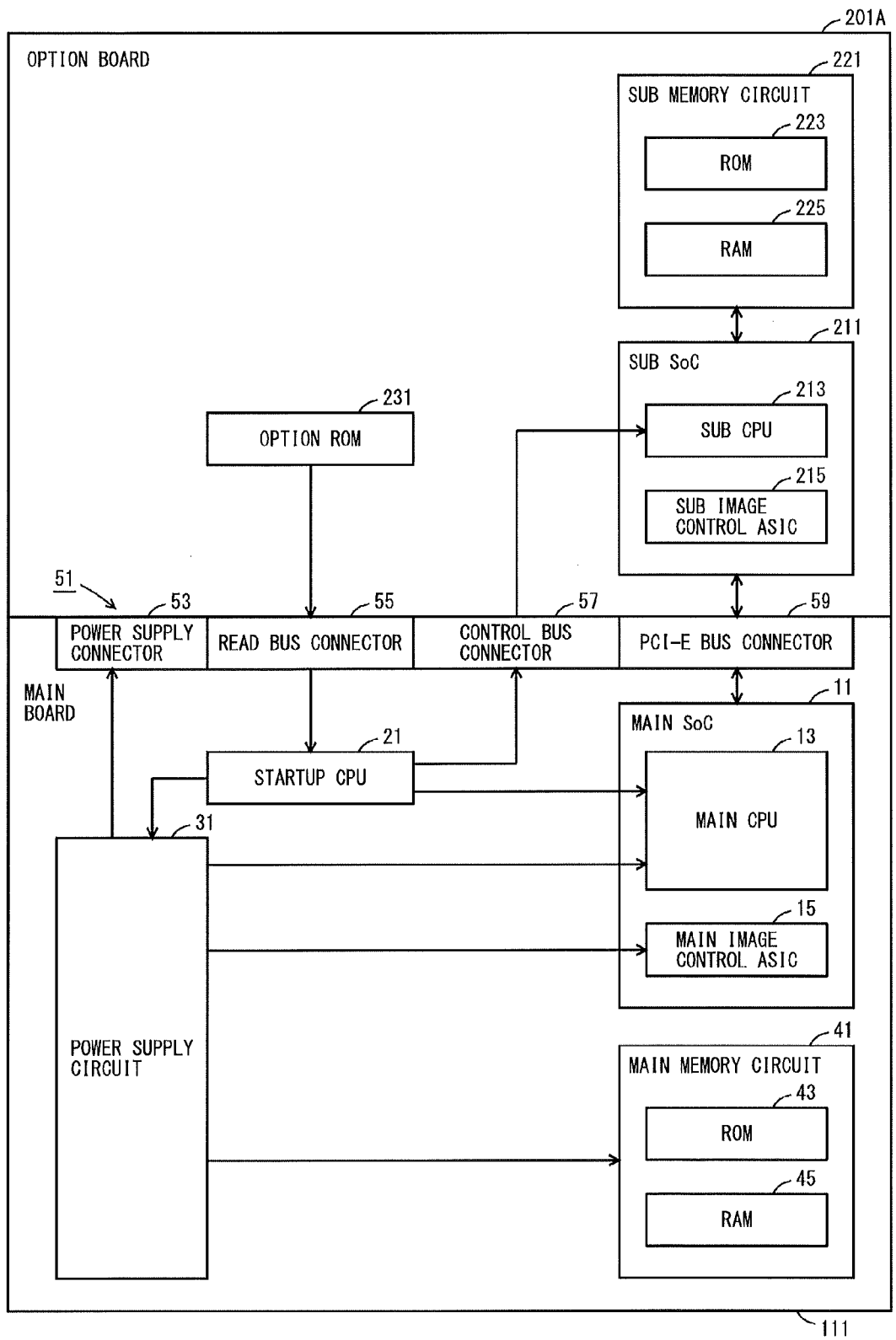
FIG. 7 is a block diagram showing an exemplary detailed configuration of a first option board.

FIG. 7 is a block diagram showing an exemplary detailed configuration of the first option board. In FIG. 7, first option board 201A is connected with main board 111. Referring to FIG. 7, first option board 201A includes a sub SoC 211, a sub memory circuit 221, and an option ROM 231.

Sub SoC 211 includes a sub CPU 213 and a sub image control ASIC 215. Sub memory circuit 221 includes a ROM 223 for storing, for example, a program to be executed by sub CPU 213 and a RAM 225 used as a working area of sub CPU 213.

The control bus of the sub CPU 213 is connected with control bus connector 57 of connection connector 51 of main board 111, and the PCI-E bus of the sub CPU 213 is connected with PCI-E bus connector 59 of connection connector 51 of main board 111.

The PCI-E bus of sub image control ASIC 215 is connected with PCI-E bus connector 59 of connection connector 51 of main board 111. Sub image control ASIC 215 includes an image processing circuit connected with sub CPU 213 through the PCI-E bus and controlled by sub CPU 213 for processing an image. Sub CPU 213 can allow sub image control ASIC 215 to perform image processing. Sub image control ASIC 215 may include a sub input/output control circuit for controlling the HDD, the communication interface board, and the like. In this case, sub CPU 213 can control the HDD or the communication interface board through sub image control ASIC 215.

Option ROM 231 stores the option ID of first option board 201A. The read bus of option ROM 231 is connected to read bus connector 55 of connection connector 51 of main board 111. The presence or absence of a GPU in the option ID of first option board 201A is set "absent," and the presence or absence of a sub image control ASIC is set "present." The boot control information includes information about GPIO of sub CPU 213. The power supply information includes information in which the power supply input pin of sub CPU 213 is associated with the first connection pin of power supply connector 53, information in which the power supply input pin of sub image control ASIC 215 is associated with the second connection pin, and information in which the power supply input pin of sub memory circuit 221 is associated with the third connection pin.

The operation of startup CPU 21 in a case where first option board 201A is connected to main board 111 will now be described.

(1) In a Case where the Processing Speed of Main CPU 13 is Lower than the Processing Speed of Sub CPU 213

Sub CPU 213 is a root complex, and main image control ASIC 15 and sub image control ASIC 215 are end points, without starting main CPU 13. In this case, power is not supplied from power supply circuit 31 to main CPU 13 and main memory circuit 41.

Specifically, startup CPU 21 controls power supply circuit 31 such that power is supplied to sub CPU 213, sub memory circuit 221, sub image control ASIC 215, and main image control ASIC 15, and power is not supplied to main CPU 13 and main memory circuit 41. In addition, startup CPU 21 resets sub CPU 213 through control bus connector 57. When being reset, sub CPU 213 executes the boot program stored in ROM 223 of sub memory circuit 221 and starts up as a root complex.

(2) In a Case where the Processing Speed of Main CPU 13 is Equal to or Higher than the Processing Speed of Sub CPU 213

Main CPU 13 is a root complex, and main image control ASIC 15 and sub image control ASIC 215 are end points, without starting sub CPU 213. In this case, power is not supplied from power supply circuit 31 to sub CPU 213 and sub memory circuit 221.

Specifically, startup CPU 21 controls power supply circuit 31 such that power is supplied to main CPU 13, main memory circuit 41, main image control ASIC 15, and sub image control ASIC 215, and power is not supplied to sub CPU 213 and sub memory circuit 221. In addition, startup CPU 21 resets main CPU 13. When being reset, main CPU 13 executes the boot program stored in ROM 43 of main memory circuit 41 and starts up as a root complex.

<Second Option Board>

Figure 8:
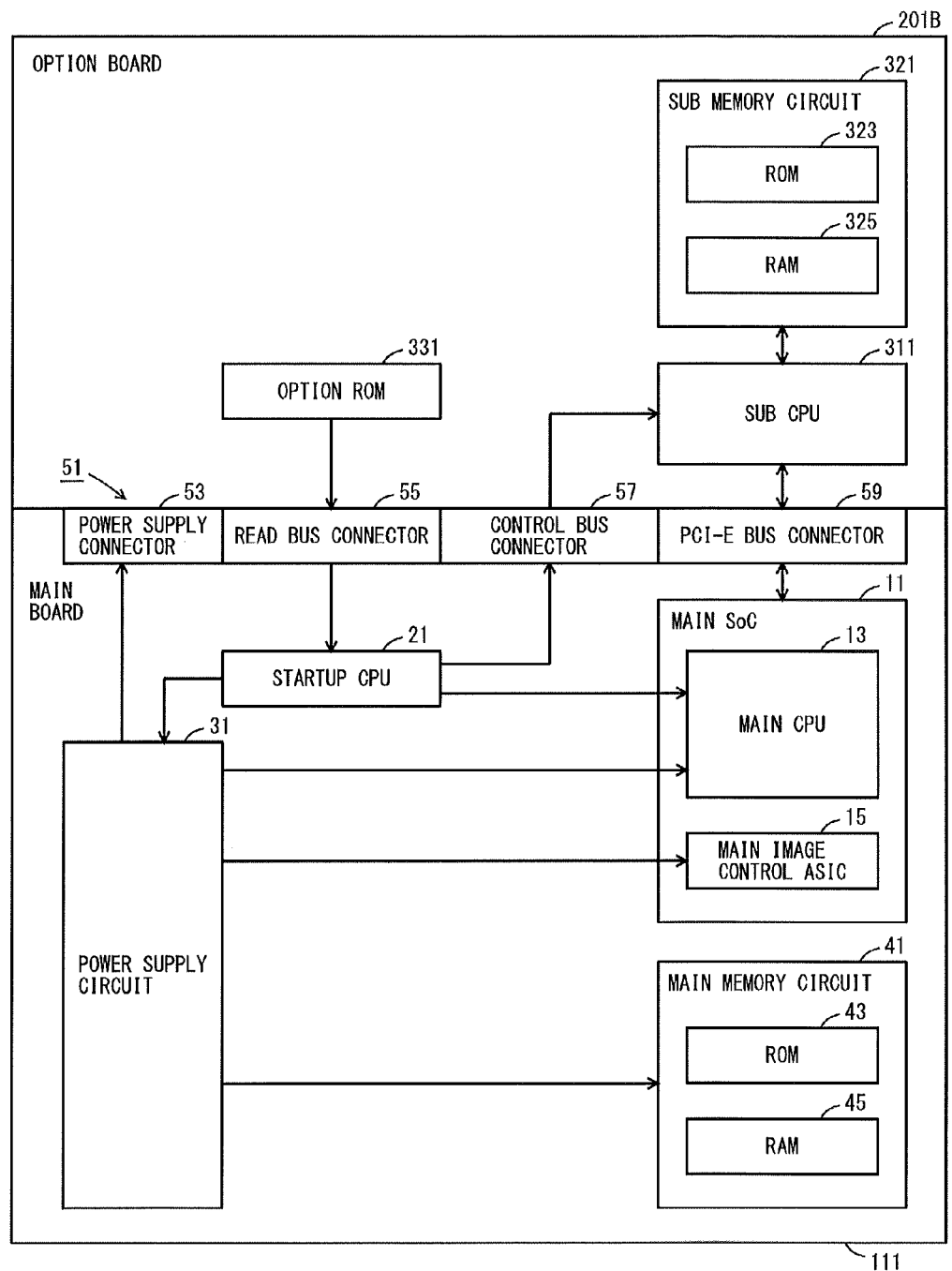
FIG. 8 is a block diagram showing an exemplary detailed configuration of a second option board.

FIG. 8 is a block diagram showing an exemplary detailed configuration of the second option board. In FIG. 8, main board 111 is connected. Referring to FIG. 8, second option board 201B includes a sub CPU 311, a sub memory circuit 321, and an option ROM 331. Sub memory circuit 321 includes a ROM 323 for storing, for example, a program to be executed by sub CPU 311 and an RAM 325 used as a working area for sub CPU 311.

The control bus of sub CPU 311 is connected with control bus connector 57 of connection connector 51 of main board 111, and the PCI-E bus of sub CPU 311 is connected with PCI-E bus connector 59 of connection connector 51 of main board 111.

Option ROM 331 stores the option ID of second option board 201B. The read bus of option ROM 331 is connected to read bus connector 55 of connection connector 51 of main board 111. The presence or absence of a GPU in the option ID of second option board 201B is set "absent," and the presence or absence of a sub image control ASIC is set "absent." The boot control information includes information about GPIO of sub CPU 311. The power supply information includes information in which the power supply input pin of sub CPU 311 is associated with the first connection pin of power supply connector 53, and information in which the power supply input pin of sub memory circuit 321 is associated with the second connection pin.

The operation of startup CPU 21 in a case where second option board 201B is connected to main board 111 will now be described.

(1) In a Case where the Processing Speed of Main CPU 13 is Lower than the Processing Speed of Sub CPU 311

Sub CPU 311 is a root complex, and main image control ASIC 15 is an end point without starting main CPU 13. In this case, power is not supplied from power supply circuit 31 to main CPU 13 and main memory circuit 41.

Specifically, startup CPU 21 controls power supply circuit 31 such that power is supplied to sub CPU 311 and sub memory circuit 321, and power is not supplied to main CPU 13 and main memory circuit 41. Startup CPU 21 resets sub CPU 311 through control bus connector 57. When being reset, sub CPU 311 executes the boot program stored in ROM 323 of sub memory circuit 321 and starts up as a root complex.

(2) In a Case where the Processing Speed of Main CPU 13 is Equal to or Higher than the Processing Speed of Sub CPU 311

Main CPU 13 is a root complex, and power supplied to second option board 201B is cut off. Main image control ASIC 15 is an end point.

Specifically, startup CPU 21 controls power supply circuit 31 such that power is supplied to main CPU 13, main memory circuit 41, and main image control ASIC 15, and power is not supplied to power supply connector 53. In addition, startup CPU 21 resets main CPU 13. When being reset, main CPU 13 executes the boot program stored in ROM 43 of main memory circuit 41 and starts up as a root complex.

<Third Option Board>

FIG. 9 is a block diagram showing an exemplary detailed configuration of the third option board. In FIG. 9, main board 111 is connected. Referring to FIG. 9, third option board 201C includes a sub CPU 411, a sub memory circuit 421, an option ROM 431, and a boot ROM 441. Sub memory circuit 421 includes a ROM 423 for storing, for example, a program to be executed by sub CPU 411 and a RAM 425 used as a working area of sub CPU 411.

The control bus of sub CPU 411 is connected with control bus connector 57 of connection connector 51 of main board 111, and the PCI-E bus of sub CPU 411 is connected with PCI-E bus connector 59 of connection connector 51 of main board 111.

Boot ROM 441 stores a boot program executed by main CPU 13 to set and start main CPU 13 as an end point. This boot program includes a program that defines a process of main CPU 13 inputting/outputting data to/from HDD 113. The read bus of boot ROM 441 is connected to read bus connector 55 of connection connector 51 of main board 111.

Option ROM 431 stores the option ID of third option board 201C. The read bus of option ROM 431 is connected to read bus connector 55 of connection connector 51 of main board 111. The presence or absence of a GPU in the option ID of third option board 201C is set "absent," and the presence or absence of a sub image control ASIC is set "absent." The boot control information includes information about GPIO of sub CPU 411. The power supply information includes information in which the power supply input pin of sub CPU 411 is associated with the first connection pin of power supply connector 53 and information in which the power supply input pin of sub memory circuit 421 is associated with the second connection pin. In the option ID of third option board 201C, the presence or absence of a boot program for setting and starting main CPU 13 as an end point is set "present," and the memory address of the boot program stored in boot ROM 441 is included.

The operation of startup CPU 21 in a case where third option board 201C is connected to main board 111 will now be described.

(1) In a Case where the Processing Speed of Main CPU 13 is Lower than the Processing Speed of Sub CPU 411

(i) In a Case where the Setting is Such that HDD 113 is Used as a Peripheral Device Sub CPU 411 is a root complex, and main CPU 13 and main image control ASIC 15 are end points.

Specifically, startup CPU 21 controls power supply circuit 31 such that power is supplied to main CPU 13, main image control ASIC 15, main memory circuit 41, sub CPU 411, and sub memory circuit 421. In addition, startup CPU 21 changes the boot program for main CPU 13 to the boot program stored in boot ROM 441 and resets main CPU 13 and thereafter resets sub CPU 411 through control bus connector 57. When being reset, main CPU 13 executes the boot program stored in boot ROM 441 and starts as an end point. In this case, main CPU 13 executes a program included in the boot program to define a process of inputting/outputting data to/from HDD 113 and thereby executes a process of inputting/outputting data to/from HDD 113. On the other hand, when being reset, sub CPU 411 executes the boot program stored in ROM 423 of sub memory circuit 421 and starts up as a root complex. Sub CPU 411 thus can control HDD 113 through main CPU 13.

(ii) In a Case where the Setting is Such that HDD 113 is not Used as a Peripheral Device Sub CPU 411 is a root complex, and main image control ASIC 15 is an end point without starting main CPU 13. In this case, power is not supplied from power supply circuit 31 to main CPU 13 and main memory circuit 41.

Specifically, startup CPU 21 controls power supply circuit 31 such that power is supplied to sub CPU 411, sub memory circuit 421, and main image control ASIC 15, and power is not supplied to main CPU 13 and main memory circuit 41. In addition, startup CPU 21 resets sub CPU 411 through control bus connector 57. When being reset, sub CPU 411 executes the boot program stored in ROM 423 of sub memory circuit 421 and starts up as a root complex. In this case, sub CPU 411 is a root complex, and main image control ASIC 15 is an end point.

(2) In a Case where the Processing Speed of Main CPU 13 is Equal to or Higher than the Processing Speed of Sub CPU 411

Main CPU 13 is a root complex, and power supplied to third option board 201C is cut off. Main image control ASIC 15 is an end point.

Specifically, startup CPU 21 controls power supply circuit 31 such that power is supplied to main CPU 13, main memory circuit 41, and main image control ASIC 15, and power is not supplied to power supply connector 53. In addition, startup CPU 21 resets main CPU 13. When being reset, main CPU 13 executes the boot program stored in ROM 43 of main memory circuit 41 and starts up as a root complex.

<Fourth Option Board>

Figure 10:
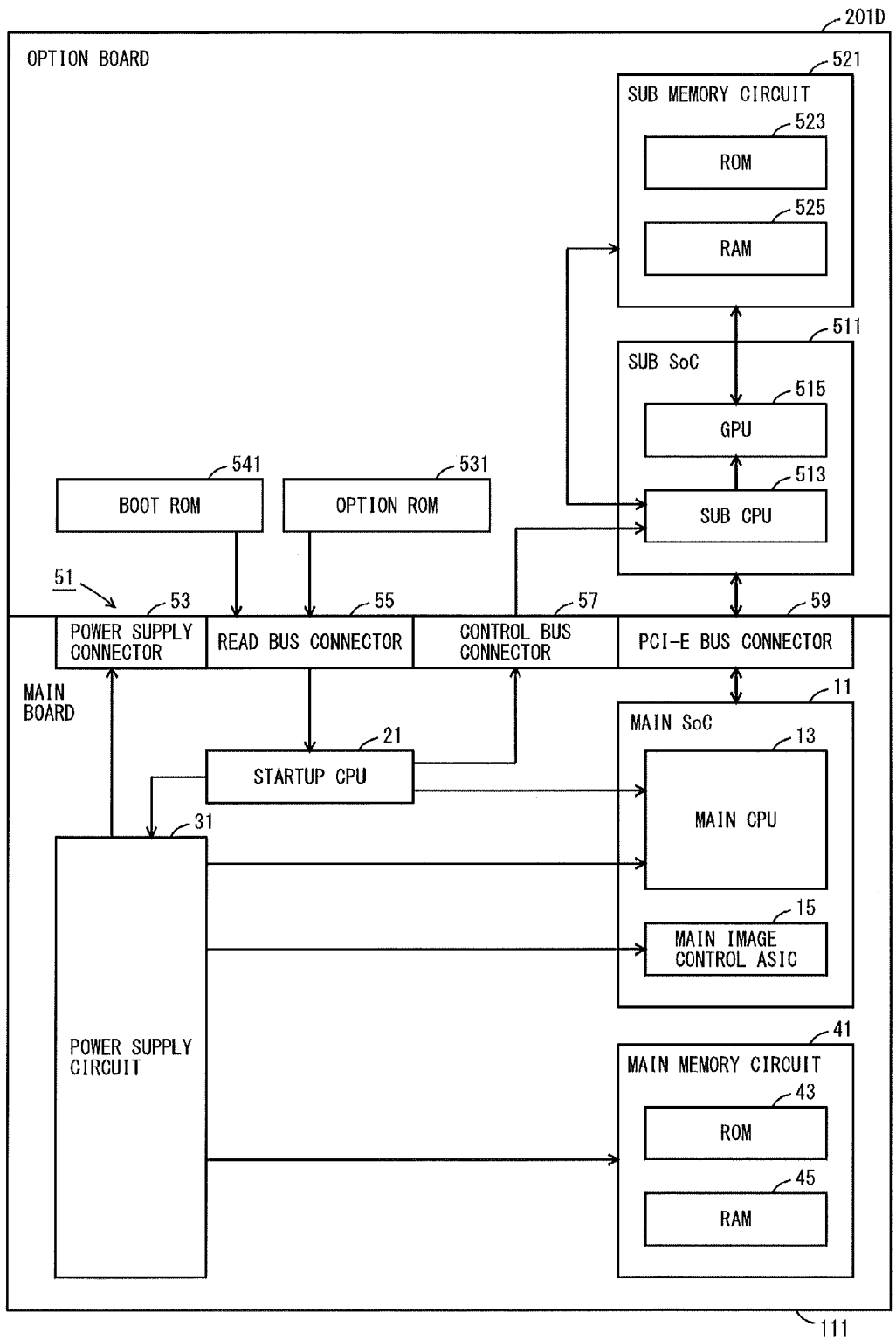
FIG. 10 is a block diagram showing an exemplary detailed configuration of a fourth option board.

FIG. 10 is a block diagram showing an exemplary detailed configuration of the fourth option board. In FIG. 10, main board 111 is connected. Referring to FIG. 10, fourth option board 201D includes a sub SoC 511, a sub memory circuit 521, an option ROM 531, and a boot ROM 541. Sub SoC 511 includes a sub CPU 513 and a GPU 515. Sub memory circuit 521 includes a ROM 423 for storing, for example, a program to be executed by sub CPU 513 and GPU 515 and a RAM 525 used as a working area for sub CPU 513 and GPU 515.

The control bus of sub CPU 513 is connected with control bus connector 57 of connection connector 51 of main board 111, and the PCI-E bus of sub CPU 513 is connected with PCI-E bus connector 59 of connection connector 51 of main board 111. GPU 515 is connected with sub CPU 513 and controlled by sub CPU 513. GPU 515 performs image processing by executing the program stored in ROM 423 of sub memory circuit 521. Accordingly, sub CPU 513 can execute another process while allowing GPU 515 to perform image processing.

Boot ROM 541 stores a boot program executed by main CPU 13 to set and start main CPU 13 as an end point. This boot program includes a program that defines a process of main CPU 13 inputting/outputting to/from HDD 113.

Option ROM 531 stores the option ID of fourth option board 201D. The read bus of option ROM 531 is connected to read bus connector 55 of connection connector 51 of main board 111. The presence or absence of a GPU in the option ID of fourth option board 201D is set "present," and the presence or absence of a sub image control ASIC is set "absent." The boot control information includes information about GPIO of sub CPU 513. The power supply information includes information in which the power supply input pin of sub CPU 513 and GPU 515 is associated with the first connection pin of power supply connector 53 and information in which the power supply input pin of sub memory circuit 521 is associated with the second connection pin. In the option ID of fourth option board 201D, the presence or absence of a boot program for setting and starting main CPU 13 as an end point is set "present," and the memory address of the boot program stored in boot ROM 541 is included.

The operation of startup CPU 21 in a case where fourth option board 201D is connected to main board 111 will now be described.

(1) In a Case where the Processing Speed of Main CPU 13 is Lower than the Processing Speed of Sub CPU 513

(i) In a Case where the Setting is Such that HDD 113 is Used as a Peripheral Device Sub CPU 513 is a root complex, and main CPU 13 and main image control ASIC 15 are end points.

Specifically, startup CPU 21 controls power supply circuit 31 such that power is supplied to main CPU 13, main image control ASIC 15, main memory circuit 41, sub CPU 513, GPU 515, and sub memory circuit 421. Startup CPU 21 changes the boot program for main CPU 13 to the boot program stored in boot ROM 541 and resets main CPU 13 and thereafter resets sub CPU 513 through control bus connector 57. When being reset, main CPU 13 executes the boot program stored in boot ROM 541 and starts up as an end point. In this case, main CPU 13 executes the program included in the boot program to define a process of inputting/outputting data to/from HDD 113 and thereby executes a process of inputting/outputting data to/from HDD 113. On the other hand, when being reset, sub CPU 513 executes the boot program stored in ROM 523 of sub memory circuit 521 and starts up as a root complex.

(ii) In a Case where the Setting is Such that HDD 113 is not Used as a Peripheral Device Sub CPU 513 is a root complex, and main image control ASIC 15 is an end point without starting main CPU 13. In this case, power is not supplied from power supply circuit 31 to main CPU 13 and main memory circuit 41.

Specifically, startup CPU 21 controls power supply circuit 31 such that power is supplied to sub CPU 513, GPU 515, sub memory circuit 521, and main image control ASIC 15, and power is not supplied to main CPU 13 and main memory circuit 41. In addition, startup CPU 21 resets sub CPU 513 through control bus connector 57. When being reset, sub CPU 513 executes the boot program stored in ROM 523 of sub memory circuit 521 and starts up as a root complex. GPU 515 is reset by sub CPU 513.

(2) In a Case where the Processing Speed of Main CPU 13 is Equal to or Higher than the Processing Speed of Sub CPU 513

Even in the case where the processing speed of main CPU 13 is equal to or higher than the processing speed of sub CPU 513, the processing speed of sub SoC 513 as a whole is often higher than that of main CPU 513 because sub SoC 511 includes GPU 515. Sub CPU 513 is therefore preferably set as a root complex.

(i) In a Case where the Setting is Such that HDD 113 is Used as a Peripheral Device Sub CPU 513 is a root complex, and main CPU 13 and main image control ASIC 15 are end points.

Specifically, startup CPU 21 controls power supply circuit 31 such that power is supplied to main CPU 13, main image control ASIC 15, main memory circuit 41, sub CPU 513, GPU 515, and sub memory circuit 421. In addition, startup CPU 21 changes the boot program of main CPU 13 to the boot program stored in boot ROM 541 and resets main CPU 13 and thereafter resets sub CPU 513 through control bus connector 57. When being reset, main CPU 13 executes the boot program stored in boot ROM 541 and starts up as an end point. In this case, main CPU 13 executes a program included in the boot program to define a process of inputting/outputting data to/from HDD 113 and thereby executes a process of inputting/outputting data to/from HDD 113. On the other hand, when being reset, sub CPU 513 executes the boot program stored in ROM 523 of sub memory circuit 521 and starts up as a root complex. GPU 515 is reset by sub CPU 513.

(ii) In a Case where the Setting is Such that HDD 113 is Used as a Peripheral Device Sub CPU 513 is a root complex, and main image control ASIC 15 is an end point without starting main CPU 13. In this case, power is not supplied from power supply circuit 31 to main CPU 13 and main memory circuit 41.

Specifically, startup CPU 21 controls power supply circuit 31 such that power is supplied to sub CPU 513, GPU 515, sub memory circuit 521, and main image control ASIC 15, and power is not supplied to main CPU 13 and main memory circuit 41. In addition, startup CPU 21 resets sub CPU 513 through control bus connector 57. When being reset, sub CPU 513 executes the boot program stored in ROM 523 of sub memory circuit 521 and starts up as a root complex. GPU 515 is reset by sub CPU 513.

As described above, MFP 100 in the present embodiment is an image forming apparatus to which option board 201 can be added. MFP 100 includes main CPU 13 set as a root complex of one or more end points of PCI Express, startup CPU 21 controlling startup of main CPU 13, and connection connector 51 connectable with option board 201 including a sub CPU set as a root complex of one or more end points of PCI Express. Startup CPU 21 includes detection portion 61 that detects option board 201 connected to connection connector 51, acquisition portion 63 that acquires ability information about option board 201 at a stage before main CPU 13 starts up, when option board 201 is detected, selection portion 65 that selects one of main CPU 13 and the sub CPU based on the ability information, and switch portion 73 that starts the selected one of main CPU 13 and the sub CPU as a root complex. Since single root complex alone is started, startup is ensured when option board 201 including a sub CPU is connected. Since one of main CPU 13 and the sub CPU is selected based on the ability information about option board 201, option board 201 including a sub CPU does not have to be dedicated to MFP 100. Option board 201 connectable can be shared with another MFP.

Switch portion 73 includes selection startup portion 89 that starts main CPU 13 without starting the sub CPU when main CPU 13 is selected, and starts the sub CPU after setting the sub CPU as a root complex without starting main CPU 13 when the sub CPU is selected. One of main CPU 13 and the sub CPU is not started, thereby ensuring that the number of root complex is one.

When option board 201 includes a sub image control ASIC having a circuit for processing an image, startup CPU 21 includes sub image processing startup portion 69 that sets and starts the sub image control ASIC as an end point even when one of main CPU 13 and the sub CPU is selected. Accordingly, in a case where option board 201 includes a sub image control ASIC, the sub image control ASIC is set as an end point and started, thereby enabling the use of the functions of option board 201.

When option board 201 does not include a sub image control ASIC having a circuit for processing an image, startup CPU 21 includes cut-off portion 71 that cuts off power to be supplied to option board 201 when main CPU 13 is selected. Accordingly, when option board 201 is connected, power consumption can be reduced while the ability of MFP 100 is optimized.

Selection portion 65 includes speed comparison portion 81 that compares the processing speed of the sub CPU defined by the ability information with the processing speed of main CPU 13, and speed basis selection portion 83 that selects one of the sub CPU and main CPU 13 that has a higher processing speed. The processing speed therefore can be increased when option board 201 is connected.

When main CPU 13 is selected by speed basis selection portion 83, selection portion 65 includes particular condition selection portion 85 that selects the sub CPU when the ability information indicates that a GPU that processes an image by executing a predetermined program is mounted on option board 201. In a case where a GPU is mounted on option board 201, the same process can be performed faster by the sub CPU and the GPU than by main CPU 13. The processing speed therefore can be increased when option board 201 is connected.

When the sub CPU is selected by particular condition selection portion 85, switch portion 73 includes overlap startup portion 91 that starts main CPU 13 after setting main CPU 13 as an end point and starts the sub CPU after setting the sub CPU as a root complex. Accordingly, main CPU 13 can be controlled by the sub CPU.

When a boot ROM that stores a boot program for allowing main CPU 13 to perform a predetermined process is mounted on option board 201, overlap startup portion 91 further includes particular condition startup portion 93 that allows main CPU 13 to execute the boot program stored in the boot ROM to start up. Accordingly, main CPU 13 can be set as an end point and started when option board 201 is connected to MFP 100.

MFP 100 further includes main image control ASIC 15 mounted on the same board as the main CPU. Startup CPU 21 includes main image processing startup portion 67 that starts main image control ASIC 15 even when one of main CPU 13 and the sub CPU is selected. Accordingly, the functions that MFP 100 has before option board 201 is connected can be used effectively.

Although MFP 100 has been described as an example of the image forming apparatus in the embodiment above, the image forming apparatus may be a printer, a facsimile, or any other devices that have the function of forming an image. It is needless say that the invention can be understood as a startup control method that allows startup CPU 21 controlling startup of MFP 100 to perform the startup process shown in FIG. 5 and FIG. 6, or as a startup control program for allowing startup CPU 21 to perform the startup control method.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image forming apparatus comprising:
a main processor set as a root complex of PCI Express;
a startup processor configured to control startup of the main processor; and
a connection portion connectable with an option board having a sub processor set as a root complex of PCI Express,
the startup processor further configured to: control portion including
detect that an option board having a sub processor set as a root complex of PCI Express is connected to the connection portion,
acquire ability information about the option board at a stage before the main processor starts up, when the option board is detected,
select one of the main processor and the sub processor, based on the acquired ability information, and
start as a root complex the main processor when the main processor is selected, and start as a root complex the sub processor when the sub processor is selected.

2. The image forming apparatus according to claim 1, wherein the startup processor is further configured to start the main processor without starting the sub processor when the main processor is selected, and to start the sub processor after setting the sub processor as a root complex without starting the main processor when the sub processor is selected.

3. The image forming apparatus according to claim 1, wherein when the option board includes a sub image processor configured to process an image, the startup processor is further configured to set and start the sub image processor as an end point even when one of the main processor and the sub processor is selected.

4. The image forming apparatus according to claim 3, when the option board does not include a sub image processor having a circuit for processing an image, the startup processor includes a cut-off portion to cut off power to be supplied to the option board when the main processor is selected.

5. The image forming apparatus according to claim 1, wherein the startup processor is further configured
to compare a processing speed of the sub processor defined by the ability information with a processing speed of the main processor, and
to select one of the sub processor and the main processor that has a higher processing speed.

6. The image forming apparatus according to claim 5, wherein when the main processor is selected by the startup processor, the startup processor is further configured to select the sub processor when the ability information indicates that a program processing portion that processes an image by executing a predetermined program is mounted on the option board.

7. The image forming apparatus according to claim 6, wherein when the sub processor is selected by the startup processor, the startup processor is further configured to start the main processor after setting the main processor as an end point and to start the sub processor after setting the sub processor as a root complex.

8. The image forming apparatus according to claim 7, wherein
a program storage portion that stores a startup program for allowing the main processor to perform a predetermined process is mounted on the option board, and
the startup processor is further configured to allow the main processor to execute the startup program stored in the program storage portion to start up.

9. The image forming apparatus according to claim 1, further comprising a main image processor mounted on a same board as the main processor and having a circuit for processing an image, wherein
the startup processor is further configured to start the main image processor even when one of the main processor and the sub processor is selected.

10. A startup control method performed in an image forming apparatus,
the image forming apparatus including
a main processor set as a root complex of PCI Express, and
a connection portion connectable with an option board having a sub processor set as a root complex of PCI Express,
the method allowing the image forming apparatus to perform:

a detection step of detecting the option board connected to the connection portion;

an acquisition step of acquiring ability information about the option board at a stage before the main processor starts up, when the option board is detected;

a selection step of selecting one of the main processor and the sub processor, based on the acquired ability information; and a switch step of starting the main processor as a root complex when the main processor is selected, and starting the sub processor as a root complex when the main processor is selected.

11. The startup control method according to claim 10, wherein the switch step includes a selection startup step of starting the main processor without starting the sub processor when the main processor is selected, and starting the sub processor after setting the sub processor as a root complex without starting the main processor when the sub processor is selected.

12. The startup control method according to claim 11, wherein
the selection step includes
a speed comparison step of comparing a processing speed of the sub processor defined by the ability information with a processing speed of the main processor, and
a speed basis selection step of selecting one of the sub processor and the main processor that has a higher processing speed.

13. The startup control method according to claim 12, wherein when the main processor is selected in the speed basis selection step, the selection step includes a particular condition selection step of selecting the sub processor when the ability information indicates that a program processor that processes an image by executing a predetermined program is mounted on the option board.

14. The startup control method according to claim 13, wherein when the sub processor is selected in the particular condition selection step, the switch step includes an overlap startup step of starting the main processor after setting the main processor as an end point, and starting the sub processor after setting the sub processor as a root complex.

15. The startup control method according to claim 14, wherein
a program storage portion that stores a startup program for allowing the main processor to perform a predetermined process is mounted on the option board, and
the overlap startup step includes a particular condition startup step of allowing the main processor to execute the startup program stored in the program storage portion to start up.

16. The startup control method according to claim 10, wherein when the option board includes a sub image processor having a circuit for processing an image, the method allows the image forming apparatus to further perform a sub image processing startup step of setting and starting the sub image processor as an end point even when one of the main processor and the sub processor is selected.

17. The startup control method according to claim 16, wherein when the option board does not include a sub image processor having a circuit for processing an image, the method allows the image forming apparatus to further perform a cut-off step of cutting off power to be supplied to the option board when the main processor is selected.

18. The startup control method according to claim 10, wherein
the image forming apparatus further includes a main image processor mounted on a same board as the main processor and having a circuit for processing an image, and
the method allows the image forming apparatus to further perform a main image processing startup step of starting the main image processor even when one of the main processor and the sub processor is selected.

19. A non-transitory computer-readable recording medium encoded with a startup control program executed in a computer controlling startup of an image forming apparatus,
the image forming apparatus including
a main processing portion set as a root complex of PCI Express, and
a connection portion connectable with an option board having a sub processing portion set as a root complex of PCI Express,
the program causing the computer to perform:
a detection step of detecting the option board connected to the connection portion;
an acquisition step of acquiring ability information about the option board at a stage before the main processing portion starts up, when the option board is detected;
a selection step of selecting one of the main processing portion and the sub processing portion, based on the acquired ability information; and
a switch step of starting one selected from the main processing portion and the sub processing portion as a root complex.

20. The non-transitory computer-readable recording medium encoded with a startup control program executed in a computer controlling startup of an image forming apparatus according to claim 19, wherein the switch step of starts the main processor as a root complex when the main processor is selected, and starts the sub processor as a root complex when the main processor is selected.

* * * * *